(12) United States Patent
Ido et al.

(10) Patent No.: US 11,150,851 B2
(45) Date of Patent: Oct. 19, 2021

(54) DISPLAY CONTROLLER, IMAGE FORMING APPARATUS INCLUDING THE SAME, AND DISPLAY CONTROL METHOD

(71) Applicant: SHARP KABUSHIKI KAISHA, Sakai (JP)

(72) Inventors: Kazuhiko Ido, Sakai (JP); Hirohito Morioka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/860,676

(22) Filed: Apr. 28, 2020

(65) Prior Publication Data

US 2020/0356327 A1    Nov. 12, 2020

(30) Foreign Application Priority Data

May 7, 2019  (JP) .............................. JP2019-087618

(51) Int. Cl.
  *G06F 3/12*    (2006.01)
  *H04N 1/00*   (2006.01)
  *G06F 3/14*    (2006.01)
  *G06F 3/0482* (2013.01)

(52) U.S. Cl.
  CPC .......... *G06F 3/1256* (2013.01); *G06F 3/0482* (2013.01); *G06F 3/121* (2013.01); *G06F 3/1431* (2013.01); *H04N 1/00427* (2013.01); *H04N 1/00472* (2013.01)

(58) Field of Classification Search
  None
  See application file for complete search history.

(56) References Cited

U.S. PATENT DOCUMENTS

| 2007/0097025 | A1* | 5/2007 | Itoh ........................ G09G 3/18 345/50 |
| 2016/0241741 | A1* | 8/2016 | Ochi .................. H04N 1/00469 |
| 2018/0314477 | A1* | 11/2018 | Watabe ................. G06F 3/1236 |
| 2018/0316802 | A1* | 11/2018 | Takamiya .......... H04N 1/00509 |
| 2019/0265921 | A1* | 8/2019 | Masumoto ............ G06F 3/1292 |
| 2019/0361975 | A1* | 11/2019 | Mannby ................ G06F 3/0482 |
| 2020/0045192 | A1* | 2/2020 | Kanki ................ H04N 1/00514 |
| 2020/0177735 | A1* | 6/2020 | Tsukada ............... H04N 1/0044 |

FOREIGN PATENT DOCUMENTS

JP         2013-084084 A    5/2013

* cited by examiner

*Primary Examiner* — Dung D Tran
(74) *Attorney, Agent, or Firm* — ScienBiziP, P.C.

(57) ABSTRACT

A display controller includes: a display unit that displays information together with a menu of operations; a screen controller that switches at least one item included in the menu between full display and compact display for display; and an operation unit that accepts an operation from a user including an operation for the menu. In a case where the operation unit accepts the operation for the menu, the screen controller switches the compact display of the menu item to the full display in response to the operation. In a case where display other than the menu is updated, the screen controller switches the full display of the menu item to the compact display.

8 Claims, 9 Drawing Sheets

DISPLAY CONTROLLER, IMAGE FORMING APPARATUS INCLUDING THE SAME, AND DISPLAY CONTROL METHOD

BACKGROUND OF THE INVENTION

Field of the Invention

The present invention relates to a display controller, an image forming apparatus including the same, and a display control method and, in particular, to control for switching between full display and compact display of items related to an operation menu.

Description of the Background Art

For example, equipment such as an image forming apparatus generally includes a display unit that displays a user's operation accepted by the equipment, a status of the equipment, and the like. While the display unit desirably has a wide display area in which all contents to be displayed are simultaneously displayed, inexpensive equipment and the like have such a tendency that many types of information have to be displayed in a limited display area.

There is a case where, while full display of words and sentences in character display facilitates understanding, such words and sentences are displayed in a small display area. In such a case, in order to fit the content in the limit display area, such words and sentences have to be abbreviated (compact display), or have to be replaced with icons. Despite the above devise, there is a high possibility that the user cannot correctly understand the display content in comparison with full display.

In a case of displaying a menu having a hierarchical structure, it is possible to reduce the number of maximum displayed items on a single screen by increasing a depth of the hierarchy. However, the increase in the depth of the hierarchy leads to an increase in required operation steps and thus to degraded operability.

In order to handle such a problem, electronic equipment is described in Japanese Unexamined Patent Application Publication No. 2013-84084. In the electronic equipment, when a menu item that is displayed in an abbreviated name is selected, a display area of the abbreviated item is expanded until a full name can be displayed. Then, when selection of the abbreviated item that is displayed in the full name is canceled, the full name is returned to the abbreviated name.

In the case where the content to be displayed in the display unit is mainly the operation menu, it is effective to adopt display control for switching between the compact display and the full display according to presence or absence of selection of the item as in Japanese Unexamined Patent Application Publication No. 2013-84084. Meanwhile, for example, a status of a multifunction peripheral such as a digital multifunction peripheral varies not in a synchronous manner with the user's operation or in a manner not directly related to the user's operation. In such equipment, it is important to provide the display related to the user's operation and the display related to the status of the equipment and the like in the limited display area in an easy-to-understand manner. This is especially important in regions using the Roman alphabet such as English and German, words of which tend to be longer than those in Chinese or Japanese.

The present invention has been made in view of the above circumstances and therefore provides a display controller, an image forming apparatus, and a display control method capable of providing an operation menu and information on the apparatus in a limited display area in a user-friendly manner.

SUMMARY OF THE INVENTION

The present invention provides (1) a display controller that includes: a display unit that displays information on an apparatus together with a menu of operations to be accepted; a screen controller that switches at least one item included in the menu between full display and compact display for display; and an operation unit that accepts an operation from a user including an operation for the menu. In a case where the operation unit accepts the operation for the menu, the screen controller switches the compact display of the menu item to the full display in response to the operation. In a case where the full display of the menu item is provided at the time of updating display other than the menu, the screen controller switches the menu item to the compact display.

(2) An image forming apparatus that includes the display controller is provided.

(3) A display control method is provided. The method includes: displaying information on an apparatus together with a menu of operations to be accepted by the apparatus on a display unit and displaying at least one item included in the menu in compact display; accepting an operation for the menu to switch compact display of the menu item to full display; and switching the full display of the menu item to the compact display at the time of updating display other than the menu. A computer executes each of the steps.

In the display controller according to the present invention, in a case where the operation unit accepts the operation for the menu, the screen controller responds to the operation by switching the compact display of the menu item to the full display. In a case where the full display of the menu item is provided at the time of updating the display other than the menu, the screen controller switches the menu item to the compact display. Therefore, it is possible to provide a user with the operation menu and the information on the apparatus in a limited display area in a user-friendly manner.

In other words, only when the user needs to operate the menu, a display area of the menu items is dynamically expanded for the full display. In this way, an entire display sentence to be transmitted to the user can be displayed, and the user can understand the displayed content correctly.

DESCRIPTION OF THE PREFERRED EMBODIMENTS

A detailed description will hereinafter be made on the present invention with reference to the drawings. It should be noted that the following description is illustrative in all respects and thus should not be construed as limiting the present invention.

First Embodiment

Configuration of Image Forming Apparatus

A description will firstly be made on a display controller and an image forming apparatus in this embodiment.

Figure 1:
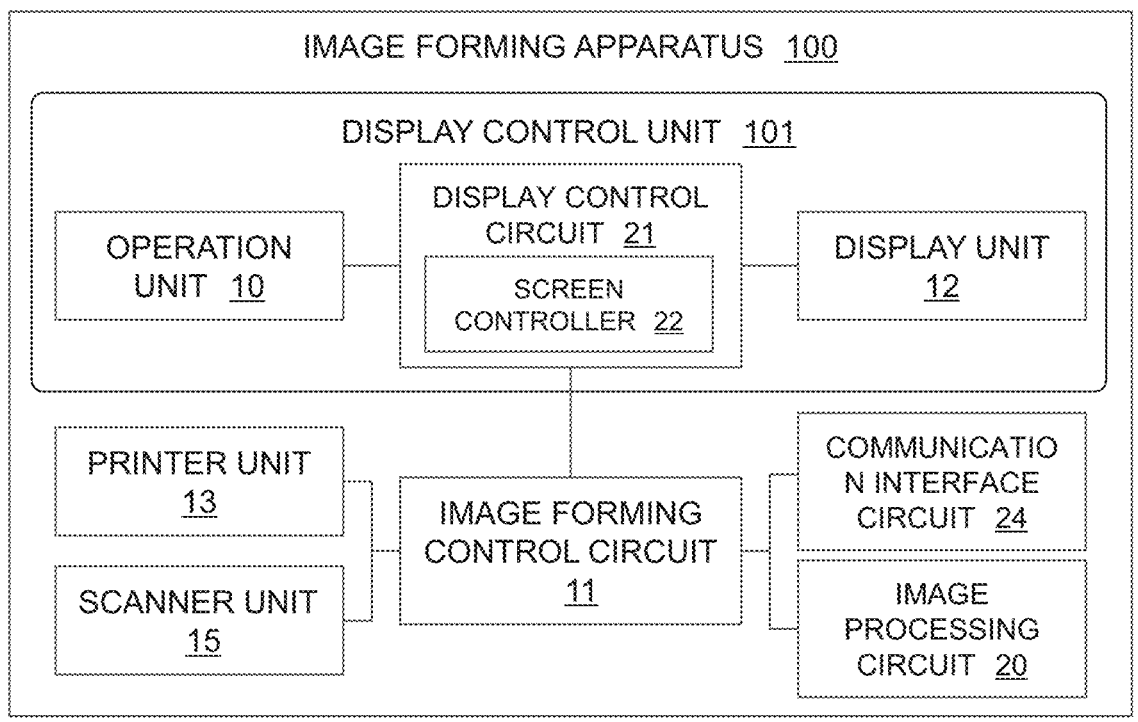
FIG. 1 is a block diagram illustrating a configuration of an image forming apparatus according to this embodiment.
Figure 2:
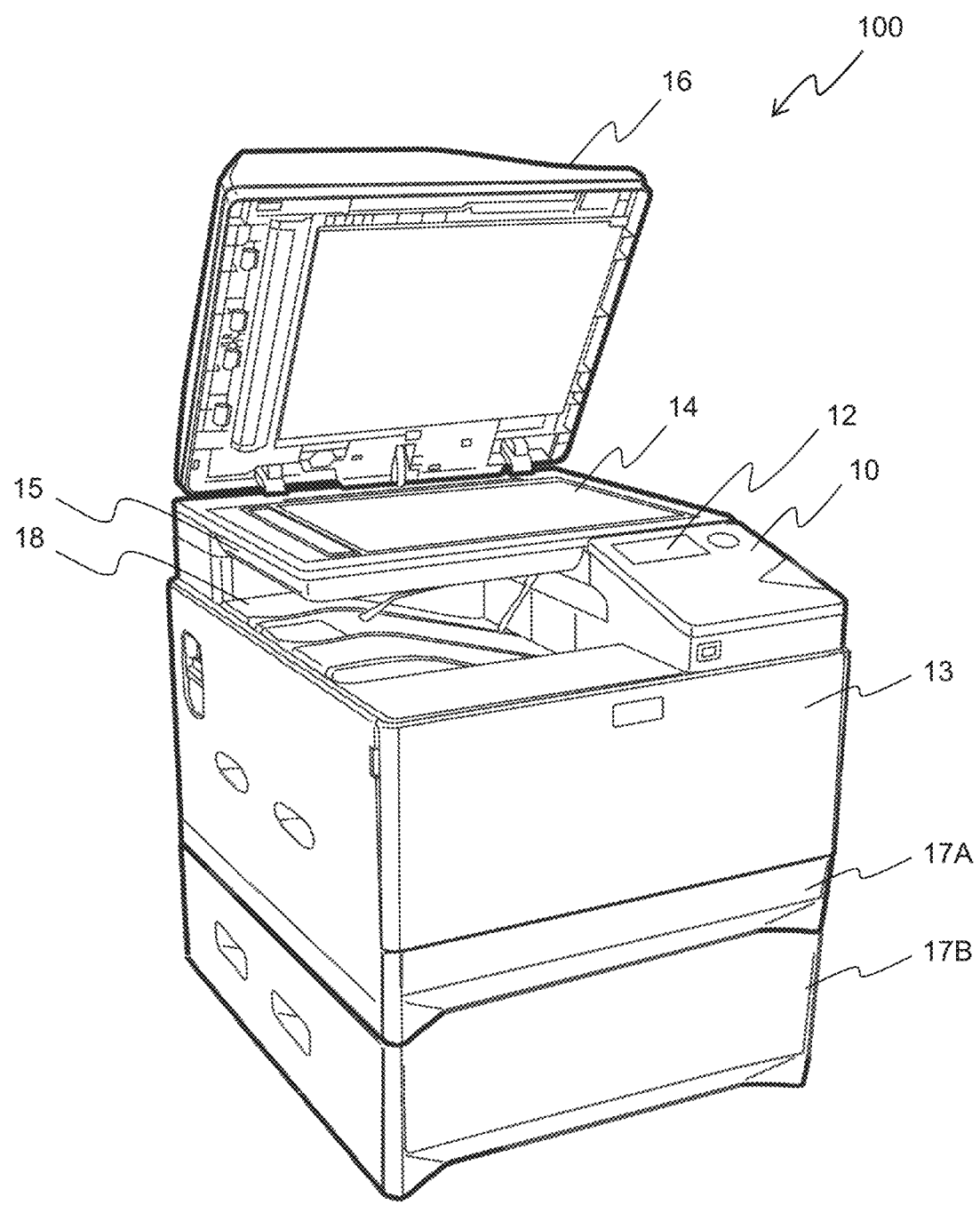
FIG. 2 is a perspective view illustrating external appearance of a digital multifunction peripheral illustrated in FIG. 1.

FIG. 1 is a block diagram illustrating a configuration of a digital multifunction peripheral as an aspect of the image forming apparatus that includes the display controller according to this embodiment. FIG. 2 is a perspective view illustrating external appearance of the digital multifunction peripheral illustrated in FIG. 1. Although the image forming apparatus is exemplified by the digital multifunction peripheral in this embodiment, the image forming apparatus may be a scanner, a copier, a fax machine, a printer, or the like, for example.

In addition, the image forming apparatus is described as an example of equipment that includes the display controller according to this embodiment. However, the equipment is not limited thereto. A display control unit 101 in FIG. 1 corresponds to the display controller.

As illustrated in FIG. 1, an image forming apparatus 100 includes the display control unit 101, an image forming control circuit 11, a printer unit 13, a communication interface circuit 24, a scanner unit 15, and an image processing circuit 20. The display control unit 101 includes an operation unit 10, a display unit 12, and a display control circuit 21. The display control circuit 21 is configured to include a central processing unit (CPU) or a micro processing unit (MPU, in the present specification, the CPU and the MPU will hereinafter collectively be referred to as the CPU for simplicity) and memory as its hardware resource. A function of a screen controller 22 is implemented by that the CPU runs a control program that is stored in the memory.

Not only the screen control of the display unit 12 but also the control of the operation unit 10 and the display unit 12 is implemented by that the CPU runs control programs widely related to operation and display. thereof. In other words, the function of the screen controller 22 is a part of the display control function of the display control circuit 21.

The screen controller 22 provides display related to user interface on the display unit 12 according to the control program, and accepts operation input by a user on the operation unit 10. and processes them.

As illustrated in FIG. 2, the operation unit 10 is provided on a casing of the image forming apparatus 100, and includes a plurality of operation buttons for accepting user's operation. A touchscreen may be provided on a display screen of the display unit 12, as described later, the touchscreen may be included in the operation unit 10.

The CPU of the display control circuit 21 recognizes a signal indicative of an input operation to the operation unit 10.

The display unit 12 includes a liquid crystal display, for example. The display unit 12 displays a menu of operations to be acceptable by the operation unit 10. The display unit 12 also displays various types of information on the basis of the input accepted by the operation unit 10 and a status of the image forming apparatus 100. The display control circuit 21 generates a content to be displayed on the display unit 12 and displays the content, further, updates the display.

The image forming control circuit 11 detects a status of each of the units in the image forming apparatus 100, and controls operation of each of the units. More specifically, the image forming control circuit 11 is constructed of hardware resources such as a CPU as a central component, memory, an input/output interface circuit, and a timer circuit. When the CPU runs an image processing program that is stored in the memory, a function related to image formation of the image forming apparatus 100 is implemented.

In detail, the image forming control circuit 11 includes RAM and ROM as the above-described memory. At least a part of the ROM may be nonvolatile rewritable memory. The CPU reads out a control program that is stored in the ROM, and appropriately loads the control program onto the RAM. Then, the CPU executes processing according to the control program that is loaded onto the RAM to control hardware provided in the image forming apparatus 100. That is, the software resources and the hardware resources cooperate to implement the functions related to the image formation such as print processing.

In FIG. 1, the display control unit 101 and the image forming control circuit 11 each has a hardware configuration that includes the separate CPU and the separate memory. However, the functions of the display control unit 101 and the image forming control circuit 11 may be implemented by using the common hardware resources. The image forming control circuit 11 and the printer unit 13 are connected to each other in a manner capable of transferring data, and the image forming control circuit 11 and the scanner unit 15 are connected to each other in the manner capable of transferring data.

As illustrated in FIG. 2, the image forming apparatus 100 includes a document table 14 and a document conveying unit 16.

Under control of the image forming control circuit 11, the scanner unit 15 reads an image of a document conveyed by the document conveying unit 16 or a document placed on the document table 14, and converts the image into an image signal. That is, the scanner unit 15 executes image reading processing in jobs of the copier, the fax machine, and the scanner.

The image processing circuit 20 generates image data on the basis of the image signal that is output from the scanner unit 15.

As illustrated in FIG. 2, the image forming apparatus 100 includes paper trays 17a, 17b and a discharge tray 18.

Paper tray 17a, 17b accommodate paper of various size individually.

Under the control of the image forming control circuit 11, a paper-feed mechanism, which is not illustrated in FIG. 1 and FIG. 2, feeds the paper in the designated paper tray into a printer and conveys the paper to the printer unit 13.

Under the control of the image forming control circuit 11, the printer unit 13 prints an image of the designated image data on the paper that is fed from one of the paper trays 17a, 17b.

A paper-discharge mechanism, which is not illustrated in FIG. 1 and FIG. 2, discharges the paper printed by the printer unit 13 to the discharge tray 18.

The communication interface circuit 24 is an interface for data communication with external equipment via a network.

Arrangement of Operation Unit and Display Unit

Figure 3:
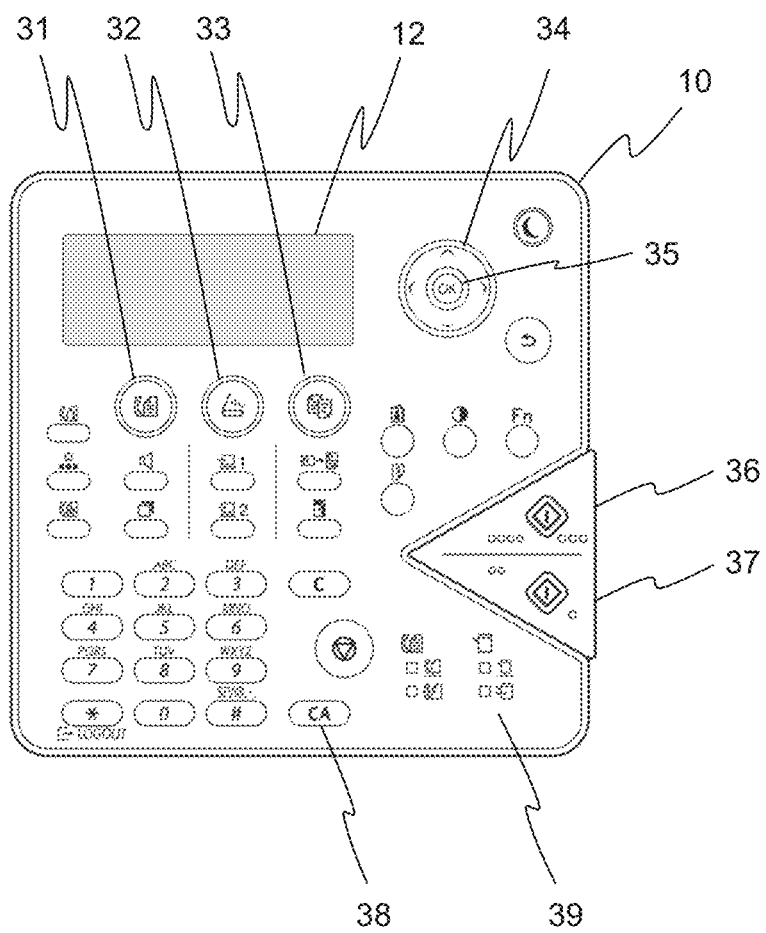
FIG. 3 is a view for illustrating arrangement of an operation unit and a display unit of the digital multifunction peripheral illustrated in FIG. 2.

FIG. 3 is a view for illustrating details of the operation unit 10 and the display unit 12 of the image forming apparatus 100 illustrated in FIG. 2.

As illustrated in FIG. 3, the operation unit 10 has a [FAX] key 31, a [SCANNER] key 32, and a [COPY] key 33, each of which is used to accepting selection of a job performed by the image forming apparatus 100. Each of those keys is self-illumination type key, and the CPU of the display control circuit 21 turns on a lamp of the key that corresponds to the selected job.

In a lower side area to area of those keys, other keys for accepting various settings are arranged as shown in FIG. 3. One of those keys is a CLEAR ALL key 38. In a case where an operation of the CLEAR ALL key 38 is accepted during the execution of a job, the CPU of the display control circuit 21 sends an instruction to stop the currently-executed job to the image forming control circuit 11. In a case where the operation of the CLEAR ALL key 38 is accepted in standby state of a job, the CPU returns the setting to an initial state. The setting in the initial state (a default setting) is defined in advance. The user may be able to change the default setting.

The display unit 12 is arranged on an upper side to area of the [FAX] key 31, the [SCANNER] key 32, and the [COPY] key 33, as shown in FIG. 3. The display unit 12 in this embodiment is the liquid crystal display capable of displaying the operation menu and the status of the image forming apparatus 100 in characters or icons in five lines. However, the display unit 12 is not limited thereto.

On the right of the display unit 12, a direction key 34 is arranged. The direction key 34 accepts an operation to switch a selection item in any direction of up, down, left, and right. In a center of the direction key 34, an [OK] key 35 is arranged. The [OK] key 35 accepts an operation to confirm the selected item or setting.

In a right end portion of the operation unit 10, a [COLOR START] key 36 and a [MONOCHROME START] key 37 are arranged adjacent to each other on an upper side and a lower side, respectively. The [Color start] key 36 accepts an operation to start a job of color copying or color scanning. The [MONOCHROME START] key 37 accepts an operation to start a job of monochrome copying or monochrome scanning.

A plurality of communication status display lamps 39 is arranged lower side of the [MONOCHROME START] key 37. Each of the communication status display lamps 39 displays a status related to the data communication of the FAX machine or the printer.

Display Control

Next, a description will be made on display control related to the contents that the screen controller 22 displays on the display unit 12, in particular, the operation menu.

Figure 4:
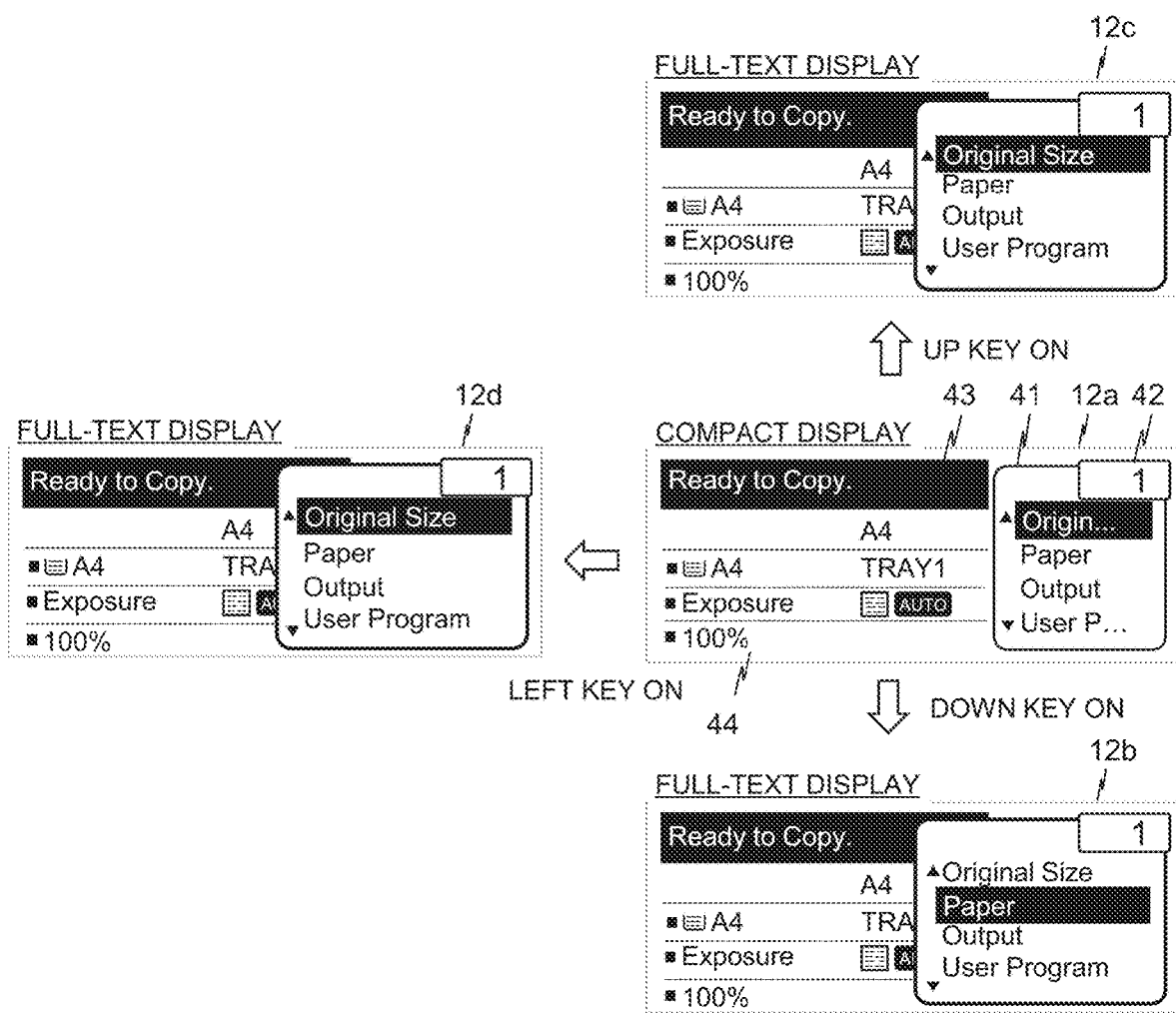
FIG. 4 includes views for illustrating a first example of control of a menu that is displayed on a basic screen in this embodiment. (First Embodiment in a case where an operation for the menu is accepted.)
Figure 5:
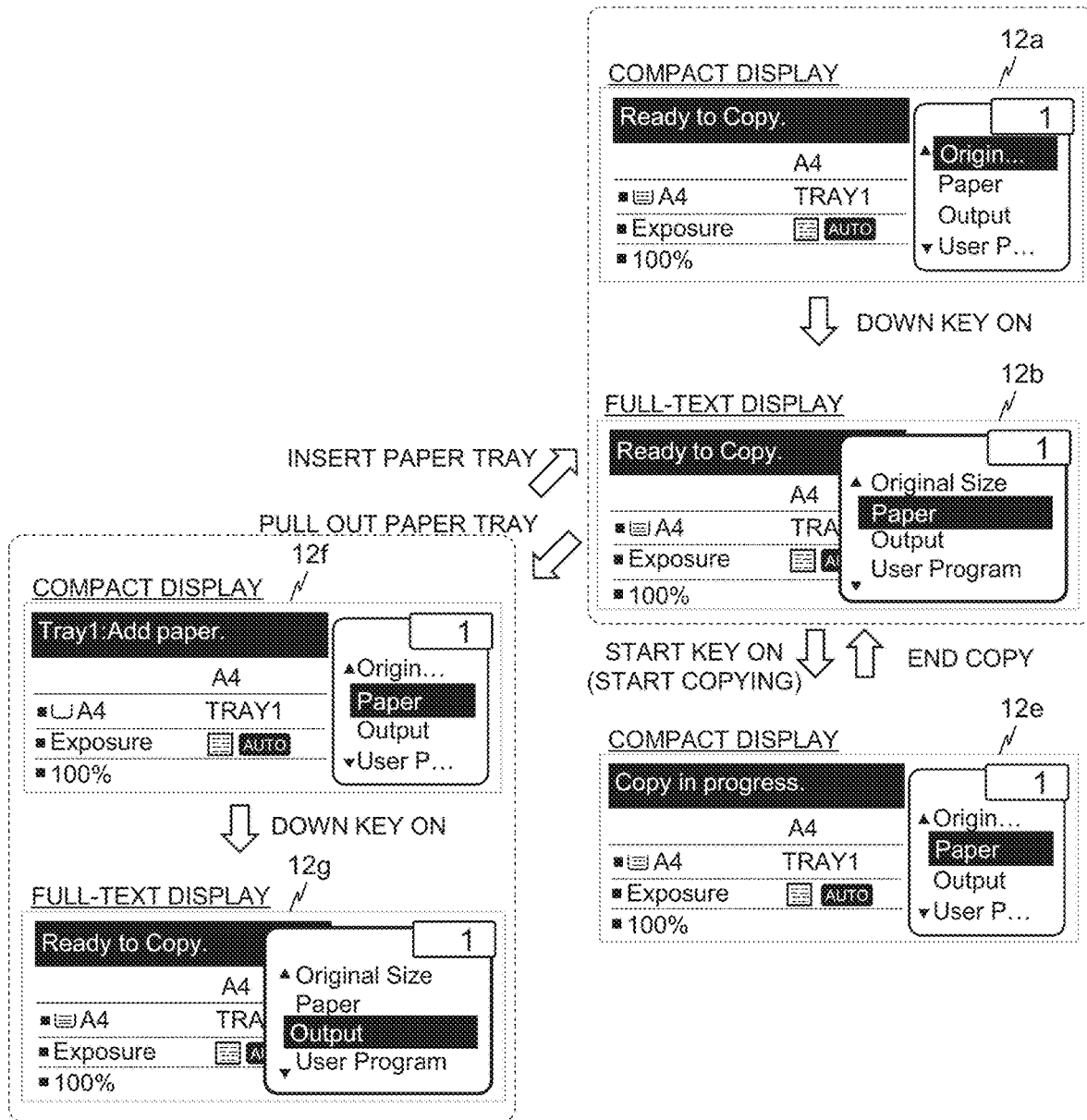
FIG. 5 includes views for illustrating a second example of the control of the menu that is displayed on the basic screen in this embodiment. (First Embodiment in a case where display other than the menu is updated.)

FIG. 4 and FIG. 5 each include views for illustrating examples of a basic screen that the screen controller 22 displays on the display unit 12 (a screen in the highest hierarchy of the hierarchical operation menu) in this embodiment.

FIG. 4 illustrates four basic screens 12a to 12d. According to the operation accepted by the operation unit 10, the screen controller 22 switches the display from one of the basic screens to another basic screen.

The screen controller 22 sets a right end portion of the basic screen 12a as a menu display area 41 for displaying the menu (also referred to as a command window in this specification). The screen controller 22 sets a remaining left area as a message display area 43 and a status display area 44. In detail, a number of paper display area 42 is displayed in an upper right portion of the menu display area 41, and a message display area 43 is displayed above the status display area 44.

The screen controller 22 displays each of the basic screens 12a to 12d by switching between full display (also described as full-text display) and compact display (also described as abbreviated display) according to a situation. Furthermore, the screen controller 22 displays the number of paper display area 42 in the upper right portion of the menu display area 41, and displays the message display area 43 and the status display area 44 in the remaining left area of the screen.

Of the four basic screens illustrated in FIG. 4, the basic screen 12a is an example of the basic screen related to the default setting in which a copy job is selected. On the basic screen 12a related to the default setting, the screen controller 22 shows the menu in the menu display area 41 by the compact display. The compact display in this embodiment is a mode in which, in a case where the menu item to be displayed does not fit in and sticks out of the menu display area 41, several characters at the end are replaced with " . . . " for display. When the menu is compacted for the display, the compact display of each of the items is defined in a manner not to hide the entire status display area 44 by the menu display area 41. Meanwhile, in regard to the full-text display, each of the items is not abbreviated and is displayed entirely.

On the basic screen 12a, the uppermost item of the menu, "Origin . . . " ("Original Size" in the full-text display, the item for document size) is selected and thus is highlighted. The number of copies displayed in the number of page display area 42 is set to "1".

The message display area 43 and the status display area 44 on the left side are provided to have five lines. The top line is the message display area 43 where the message is displayed. In a case where the long message is displayed, the message display area 43 may be expanded to have plural lines, and an upper portion of the status display area 44 may be hidden by the expanded message display area 43. In the example illustrated in FIG. 4, "Ready to Copy." is displayed in displayed in the message display area 43, indicating to the user a state where the copy job is ready to start immediately.

The status display area 44 is provided below the message display area 43.

The first line from the top of the status display area 44 is the display related to the document, and displays s to the user a state where A4 size is set as the document size.

The third line from the top of the message display area 43 is the display related to the selected paper tray, and displays an amount of a paper stock accommodated in the paper tray, paper size (the A4 size in the basic screen 12a), and the selected tray (TRAY 1 in the basic screen 12a, the paper tray 17a illustrated in FIG. 2).

The fourth line from the top of the message display area 43 is the display related to density for reading the document.

The basic screen 12a displays to the user that an automatic exposure setting for the text document is selected.

The fifth line from the top of the message display area 43 is the display related to copy magnification. The basic screen 12a displays that 100% is selected to the user.

In a case where a down key of the direction key 34 is operated in a state where the basic screen 12a related to the default setting is displayed, the screen controller 22 switches the display from the basic screen 12a to the basic screen 12b. More specifically, the screen controller 22 switches the menu from the compact display to the full-text display, selects "Paper" (paper) right below the previously-selected menu item "Origin . . . ", and highlights "Paper" for the display. That is, when accepting the operation on the menu, the screen controller 22 switches the menu from the compact display to the full-text display in response to the accepted operation, and executes processing according to the operation.

In a case where the menu is switched to the full-text display, right end portions of the message display area 43 and the status display area 44 are hidden by the expanded menu display area 41.

Meanwhile, when accepting an operation of an up key of the direction key 34 on the basic screen 12a, the screen controller 22 switches the display to the basic screen 12c. That is, the screen controller 22 switches the menu from the compact display to the full-text display. Here, since currently-selected "Original Size" is the uppermost item, the screen controller 22 keeps selecting the item.

In addition, when accepting an operation of a left key of the direction key 34 on the basic screen 12a, the screen controller 22 switches the display to the basic screen 12d. That is, the screen controller 22 switches the menu from the compact display to the full-text display. The screen controller 22 keeps selecting the menu item.

When accepting an operation of an "OK" key 35 on the basic screen 12a, the screen controller 22 switches to a display screen in the lower hierarchy that is related to the selected menu item. Then, the screen controller 22 accepts a setting related to the menu item. Since processing related to display screen in the lower hierarchy is not directly related to the present invention, a further description will not be made.

Next, a description will be made on processing that is executed when the screen controller 22 updates the display other than the menu.

FIG. 5 illustrates a state where the screen controller 22 switches the menu to the compact display according to the update of the display other than the menu. FIG. 5 illustrates two examples of a case where the display other than the menu is switched. A first example is a case where the operation of the [COLOR START] key 36 or the [MONOCHROME START] key 37 is accepted to initiate the copy job. A second example is a case where the paper tray 17a is pulled out.

The basic screens 12a, 12b illustrated in FIG. 5 are the same as those illustrated in FIG. 4. In a case where the screen controller 22 accepts the operation of the [COLOR START] key 36 or the [MONOCHROME START] key 37 on the basic screen 12b on which the menu is displayed in full text, the screen controller 22 changes the message displayed in the message display area 43 to "Copy in progress." (see a basic screen 12e). At the same time, the screen controller 22 switches the menu from the full-text display to the compact display so as to prevent the message display area 43 from being hidden by the menu. Furthermore, the screen controller 22 sends an instruction to start a job related to the color copying or monochrome copying to the image forming control circuit 11.

When the copy job is finished, the screen controller 22 changes the display of the message display area 43 to "Ready to Copy.", and returns the display to the basic screen 12b prior to the start of the copy job.

Figure 6:
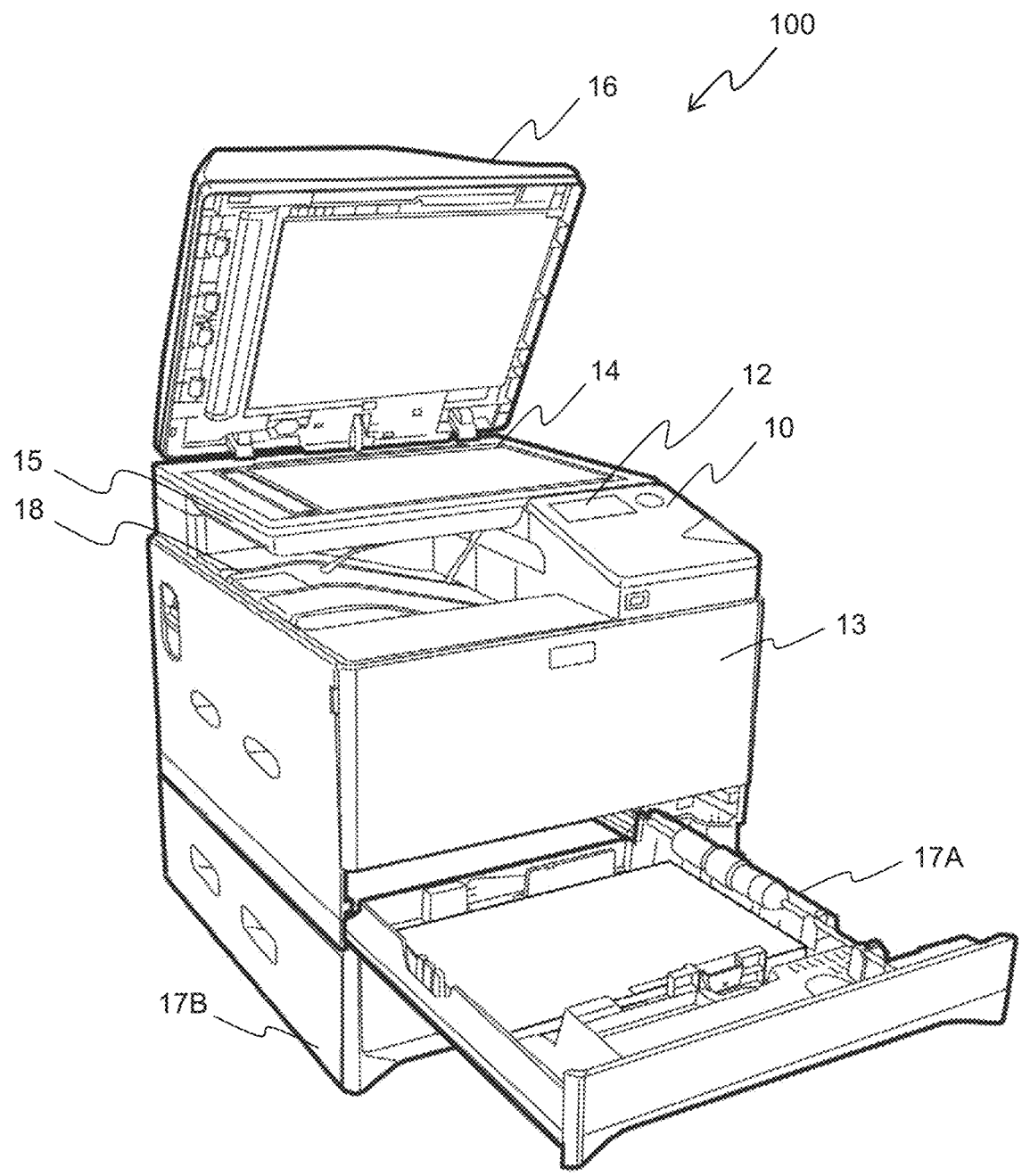
FIG. 6 is a perspective view illustrating a state where a paper tray of the digital multifunction peripheral illustrated in FIG. 2 is pulled out.

In a case where the paper tray 17a is pulled out on the basic screen 12b (see FIG. 6), the screen controller 22 changes the message displayed in the message display area 43 to "Tray1: Add paper.", and updates the display of the amount of the paper stock on the status display area 44 (see a basic screen 12f). At the same time, the menu that is displayed in full text is switched to the compact display so as to prevent the updated message or the status display related to the paper tray from being hidden by the menu.

When the paper tray 17a that has been pulled out is inserted in a body, the screen controller 22 changes the display of the message display area 43 to "Ready to Copy.", updates the display of the amount of the paper stock, and returns the display to the basic screen 12b before the paper tray is pulled out.

In a case where the down key of the direction key 34 is operated on the basic screen 12f in the state where the paper tray 17a is pulled out, the screen controller 22 switches the display from the basic screen 12f to a basic screen 12g. That is, the screen controller 22 switches the menu from the compact display to the full-text display, moves the menu item from "Paper" that has been selected to "Output" (output sorting) right below, and highlights "Output". In other words, when accepting the operation for the menu, the screen controller 22 responds to the accepted operation, switches the menu from the compact display to the full-text display, and executes processing according to the operation.

The description has been made so far on the processing that is executed on the basic screen of copy job, as an example, when the operation for the menu is accepted and when the display other than the menu is changed. The same applies to the basic screen related to other jobs.

As it has been described so far, in a case where the number of the characters to be displayed does not fit in the displayable range of the display area, the "compact display" is usually provided. However, when the user's operation for the menu is accepted, with such an event being a trigger, the menu display area 41 is expanded to display full-text display on each of the items of the menu. In addition, in a case where the display other than the menu is updated, with such an event being a trigger, the display of the menu is returned to the compact display. Only when the user performs the operation related to the menu, the display of the menu items is dynamically expanded in full text.

Second Embodiment

In this embodiment, a description will be made on processing that is executed in a case where the following operation for the menu is not provided before a lapse of a specified period since the operation for the menu is accepted.

Figure 7:
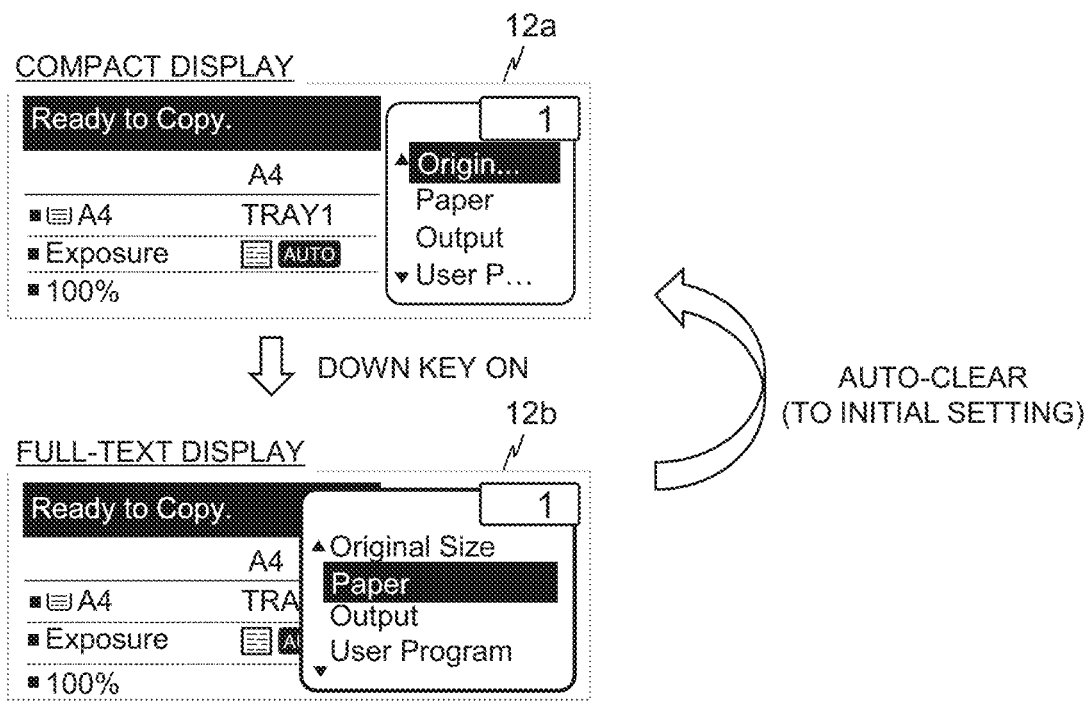
FIG. 7 includes views for illustrating a third example of the control of the menu that is displayed on the basic screen in this embodiment. (Second Embodiment in a case where a next operation for the menu is not performed in a specified period.)

FIG. 7 includes views for illustrating a control example of the menu that is displayed on the basic screen in this embodiment. The basic screens 12a, 12b illustrated in FIG. 7 are the same as those illustrated in FIG. 4. It is assumed that, similar to FIG. 4, in response to the operation of the down key of the direction key 34, the screen controller 22 switches the basic screen 12a to the basic screen 12b in which the menu is displayed in full text.

In a case where the operation of the down key is accepted and then a predetermined period (one minute in an example) elapses without any operations for the menu, the screen controller 22 switches the menu from the full-text display to the compact display.

In this embodiment, after the lapse of the above period, with such an event being a trigger, the screen controller 22 returns the display screen to the basic screen 12a that is related to the default setting. In other words, the screen controller 22 not only switches the menu to the compact display but also returns the menu to the default setting. In FIG. 7, the menu item "Paper" that is selected on the basic screen 12b is returned to the selection item "Origin . . . " in the initial state.

Such switching is the same as that of the case where the CLEAR ALL key 38 is operated on the basic screen 12b. Although not illustrated in FIG. 7, for example, in a state where the copy magnification was changed to 70% the copy magnification is changed to 100% when the screen display is returned to the basic screen 12a of the default setting.

However, the present invention is not limited thereto. The menu that is displayed in full text may only be returned to the compact display, and may not be returned to that of the default setting. That is, instead of auto-clear processing to return the screen display to the initial state after a lapse of a specified first period, the menu that is displayed in full text may be returned to the compact display after a lapse of a specified second period.

Third Embodiment

In this embodiment, a description will be made on processing that is executed in a case where an operation related to a compact display instruction is defined in advance as a particular instruction related to the menu display. Here, as an example, the compact display instruction is assigned to a right key of the direction key 34.

Figure 8:
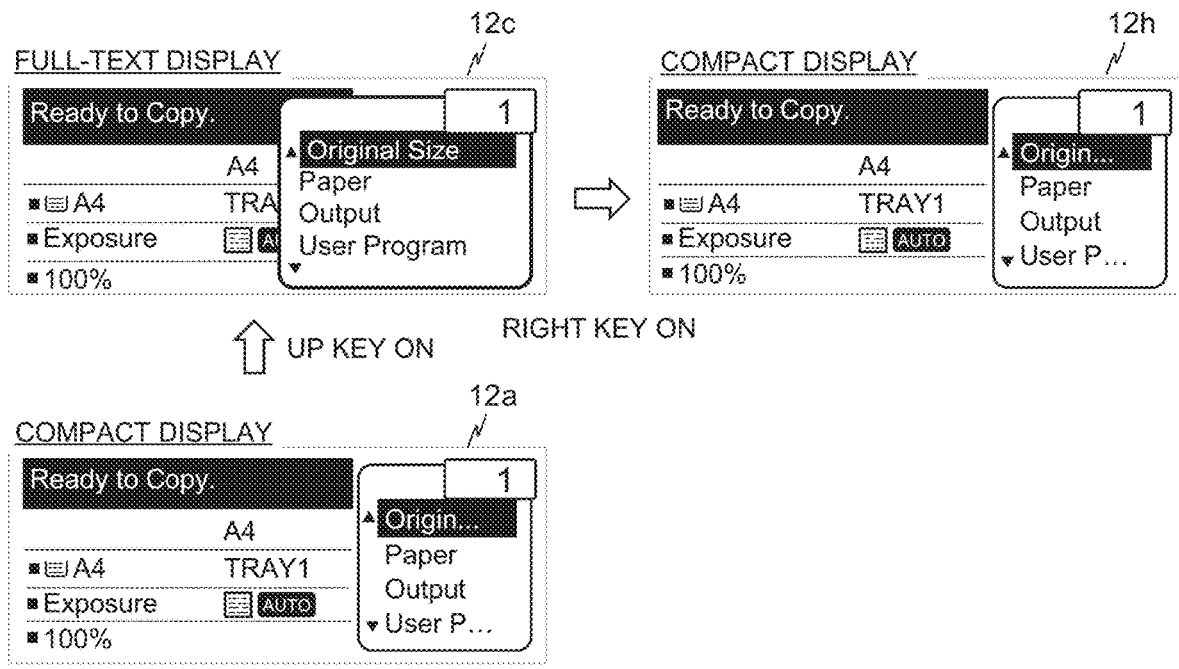
FIG. 8 includes views for illustrating a fourth example of the control of the menu that is displayed on the basic screen in this embodiment. (Third Embodiment in a case where a specified compact display instruction is accepted.)

FIG. 8 includes views for illustrating a control example of the menu that is displayed on the basic screen in this embodiment. The basic screens 12a, 12c illustrated in FIG. 8 are the same as those illustrated in FIG. 4. It is assumed that, similar to FIG. 4, when accepting the operation of the up key of the direction key 34, with such an event being a trigger, the screen controller 22 switches the basic screen 12a to the basic screen 12c in which the menu is displayed in full text.

When accepting the operation of the right key of the direction key 34 on the basic screen 12c, in response to the accepted operation, the screen controller 22 switches the menu on the basic screen 12c to the compact display (see a basic screen 12h). As a result, all the right end portions of the message display area 43 and the status display area 44 that are previously hidden by the expanded menu display area 41 are displayed.

The compact display instruction only switches the menu to the compact display and does not change the selection item or the contents of the message and the status display.

State Transition View of Menu Display Control

Figure 9:
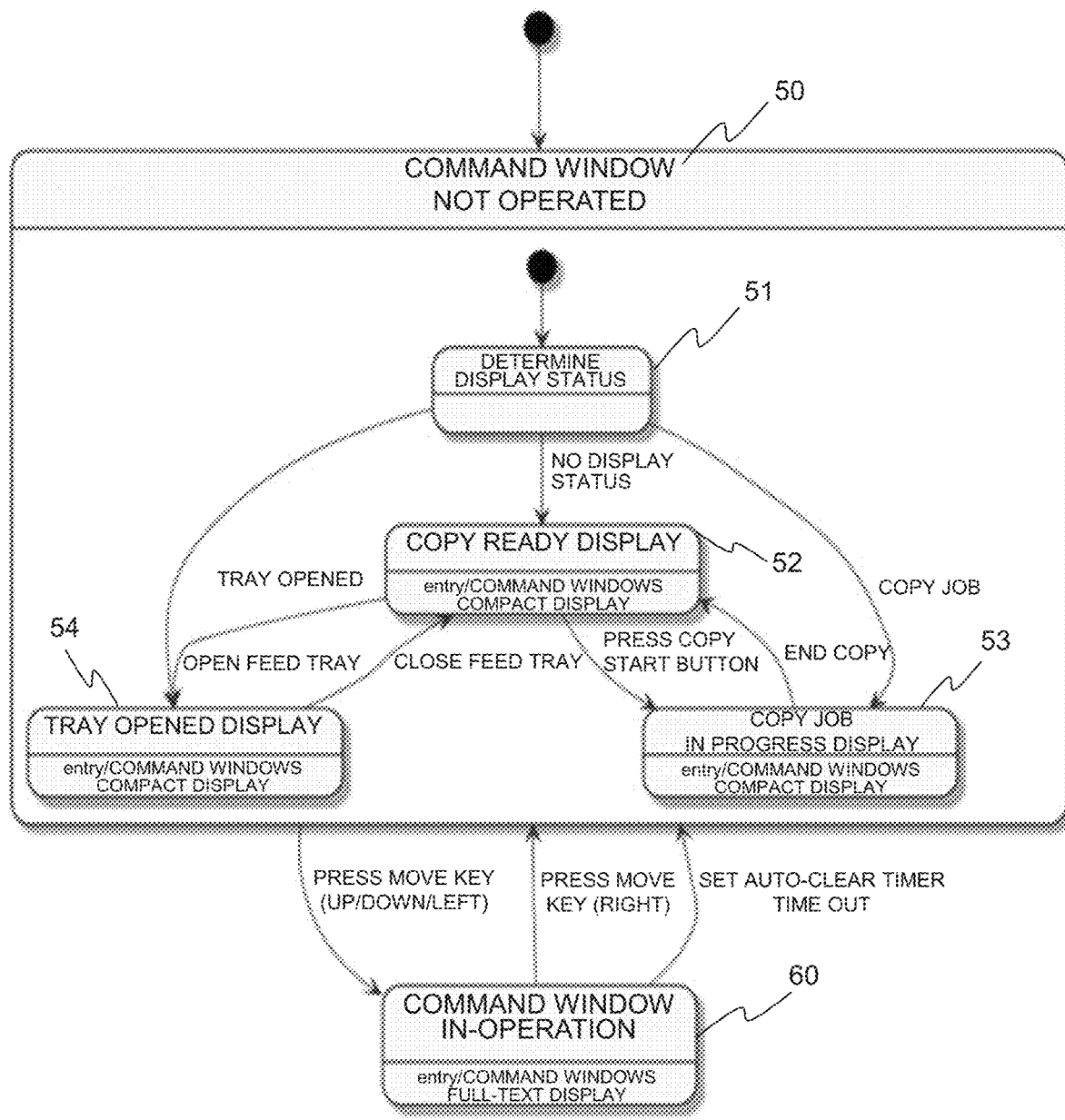
FIG. 9 is a state transition view illustrating switching control between compact display and full display of the menu in this embodiment.

FIG. 9 is a state transition view illustrating the display control described in the above-described first to third embodiments. That is, FIG. 9 illustrates state transition that corresponds to FIG. 4, FIG. 5, FIG. 7, and FIG. 8. The other events related to the change of the display screen are not illustrated for simplicity.

In FIG. 9, a rounded rectangle indicates one state, and a state name is described in an upper portion of the rounded rectangle that is vertically divided by a horizontal line. In a case where processing (entry operation) to shift to such a state is executed, a description starting with "entry/" is provided in a lower portion of the rounded rectangle that is divided by the horizontal line. Black circles indicate an initial state (a simulated starting state). Each arrow line that connects the states indicates a state transition, and an event that triggers the state transition is described near each of the arrow lines.

As illustrated in FIG. 9, the screen controller 22 makes a transition between a "COMMAND WINDOW NOT OPERATED" state 50 and a "COMMAND WINDOW IN-OPERATION" state 60.

When any of the up, down, and left keys of the direction key 34 is operated in the "COMMAND WINDOW NOT OPERATED" state 50, the screen controller 22 responds to such an operation by shifting the state to the "COMMAND WINDOW IN-OPERATION" state 60. At the time of the transition, as the entry operation, the command window is switched to the full-text display.

In a case where the right key of the direction key 34 is operated in the "COMMAND WINDOW IN-OPERATION" state 60, the screen controller 22 responds thereto by shifting the state to the "COMMAND WINDOW NOT OPERATED" state 50.

The same applies to the case where a specified period elapses without any operations for the menu from acceptance of the operation for the command window in the "COMMAND WINDOW IN-OPERATION" state 60 and the auto-clear processing is executed.

When the transition to the "COMMAND WINDOW NOT OPERATED" state 50 occurs, firstly, the screen controller 22 further shifts the state to a "DETERMINE DISPLAY STATUS" state 51 as a lower-level state.

In the "DETERMINE DISPLAY STATUS" state 51, the screen controller 22 determines whether it is currently in a display status where a particular message other than the standby message display "Ready to Copy." is displayed.

If it is currently in the state where the particular message is not displayed, that is, if it is currently in the standby status, the screen controller 22 shifts the lower state to a "COPY READY DISPLAY" state 52. At the time of the transition, as the entry operation, the screen controller 22 switches the command window to the compact display. That is, in a case where the command window is displayed in full text, the command window is switched to the compact display by this processing. In a case where the compact display of the command window is already provided, the compact display of the command window is maintained. The same applies to the entry operation for the compact display in other lower states.

In a case where the screen controller 22 determines that it is in the status where the message "Copy in progress." during the copy job is displayed in the "DETERMINE DISPLAY STATUS" state 51, the screen controller 22 shifts the lower state to a "COPY JOB IN PROGRESS DISPLAY" state 53. At the time of the transition, as the entry operation, the screen controller 22 switches the command window to the compact display.

Alternatively, in a case where the screen controller 22 determines that it is in the status where the message "Tray1: Add paper" at the time when the paper tray is opened is displayed in the "DETERMINE DISPLAY STATUS" state 51, the screen controller 22 shifts the lower state to a "TRAY OPENED DISPLAY" state 54. At the time of the transition, as the entry operation, the screen controller 22 switches the command window to the compact display.

In a case where the screen controller 22 accepts the operation of the [COLOR START] key 36 or the [MONOCHROME START] key 37 in the "COPY READY DISPLAY" state 52, the screen controller 22 shifts the lower state to the "COPY JOB IN PROGRESS DISPLAY" state 53. At the time of the transition, as the entry operation, the screen controller 22 switches the command window to the compact display.

When copying is finished, the screen controller 22 shifts the lower state to the "COPY READY DISPLAY" state 52. As the entry operation during the transition, the screen controller 22 switches the command window to the compact display in a case where the command window is displayed in full text. In a case where the compact display of the command window is already provided, the compact display of the command window is maintained. For example, on the basic screen 12e during copying, which is illustrated in FIG. 5, the compact display of the command window is provided. Thus, the compact display of the command window is maintained after copying is finished (see the basic screen 12a illustrated in FIG. 5).

In a case where the paper tray is pulled out in the "COPY READY DISPLAY" state 52, the screen controller 22 shifts the lower state to the "TRAY OPENED DISPLAY" state 54. As the entry operation during the transition, the screen controller 22 shifts the command window to the compact display in a case where the command window is displayed in full text (see the basic screen 12f illustrated in FIG. 5). In a case where the compact display of the command window is already provided, the compact display thereof is maintained.

When the paper tray that has been pulled out is inserted, the screen controller 22 shifts the lower state to the "COPY READY DISPLAY" state 52. As the entry operation during the transition, the screen controller 22 switches the command window to the compact display in a case where the command window is displayed in full text. In a case where the compact display of the command window is already provided, the compact display thereof is maintained (see the basic screen 12a illustrated in FIG. 5).

The description that has been described so far corresponds to the content of the state transition view illustrated in FIG. 9.

Other Embodiments

The description has been made so far on the example in which the screen controller 22 switches the display of the items included in the operation menu between the full-text display and the compact display. However, the present invention is not limited to the events described in the first to third embodiments, and various events for switching the display of the items included in the menu are considered.

For example, the document conveying unit 16 of the image forming apparatus 100 illustrated in FIG. 2 may have a function of detecting the size of the set document and, with the detection of the size of the set document being a trigger of the event, the screen controller 22 may switch the command window to the compact display.

The image forming apparatus 100 may have a manual feed paper tray in which special types of paper (for example, a postcard, heavy paper, and the like) can be set and, with setting of the paper in the manual feed paper tray being the trigger of the event, the screen controller 22 may switch the command window to the compact display.

Furthermore, the image forming apparatus 100 may have an interface via which a USB device such as USB memory is connected to the image forming apparatus 100 and, with connection of the USB device via the interface being the trigger of the event, the screen controller 22 may switch the command window to the compact display.

Alternatively, instead of the direction key 34, a touchscreen as an operation unit may be arranged on a display surface of the display unit 12. When any of the items in the menu display area 41 is touched, with such an event being the trigger, the screen controller 22 may switch the menu to the full-text display. In addition, when the area other than the menu display area 41 is touched, for example, when the status display area 44 is touched, with such an event being the trigger, the screen controller 22 may switch the menu to the compact display.

As it has been described so far,
(i) The display controller according to the present invention includes: the display unit that displays information on the apparatus together with the menu of the operations to be accepted; the screen controller that switches the display of at least one item included in the menu between the full display and the compact display; and the operation unit that accepts the operation from the user including the operation for the menu. In a case where the operation unit accepts the operation for the menu, the screen controller responds to the operation by switching the compact display related to the menu item to the full display. In a case where the full display of the menu item is provided at the time of updating the display other than the menu, the screen controller switches the menu item to the compact display.

In the present invention, the operation menu is provided to systematically and hierarchically classify the operations related to the settings and the like, so as to allow the desired operation to be performed by tracing the item related to the classification. The basic screen in the above-described embodiment is the example of the display screen that corresponds to the lower levels of the uppermost hierarchy of the operation menu, and the items displayed in the menu display area correspond to the items related to the classification.

In addition, the information on the apparatus is the information on the settings and the status of the apparatus. In the above-described embodiment, the contents displayed in the message display area and the status display area correspond to the information on the apparatus.

Furthermore, the screen controller controls the display unit for the display. As a specific aspect of the screen controller, the function that is implemented by organically joining the hardware resources, which are constructed of the circuits including the CPU and the memory as the central components, and the software processing (the software resources), which is realized when the CPU runs the program stored in the memory.

The operations to the menu are the operations related to the operation menu, and include not only the operations that are related to the settings organized by the menu but also the operation to move to the different item or level of the menu and the operation to change the display mode of the menu.

Changing the display other than the menu has a first purpose of changing the display content other than the menu, and may include changing the display of the menu in conjunction with such a change. For example, in the above-described embodiment, changing of the message and changing of the display of the amount of the paper stock in response to pulling out of the paper tray correspond to changing of the display content other than the menu.

The full display is the mode in which all the characters are displayed when the menu item is displayed in the characters, for example. Meanwhile, the compact display is the mode in which some of the characters are not displayed or the characters are entirely or partially replaced with a symbol or the like, so as to reduce the area required to display the item to be smaller than that in the full display. The display is not limited to that of the characters. In at least one of the full display and the compact display, a mode in which an image such as the icon is displayed and a mode in which the image and the characters are mixed for the display can also be adopted.

In the above-described embodiment, in a case where the full display of the item to be displayed does not fit in and sticks out of the menu display area, several characters at the end are replaced with " . . . " for the compact display.

A further description will be made on preferred aspects of the present invention.

(ii) In a case where the operation unit accepts the operation related to the display other than the menu, the screen controller may switch the full display of the menu item to the compact display.

In this way, when the operation unit accepts the operation related to the display other than the menu, it is possible to enlarge the display area for the information on the apparatus and thus to facilitate understanding of the information by the user.

(iii) When the operation unit accepts the compact display instruction that is defined in advance as the operation for the menu, the screen controller may switch the full display of the item to the compact display.

In this way, when the operation unit accepts the compact display instruction, it is possible to enlarge the display area for the information on the apparatus and thus to facilitate understanding of the information by the user.

(iv) In a case where the operation unit does not accept the next operation for the menu before the predetermined period elapses from the acceptance of the operation for the menu, the screen controller may switch the full display of the item to the compact display.

In this way, when the next operation for the menu is not accepted before the lapse of the predetermined period from the acceptance of the operation for the menu, it is possible to enlarge the display area for the information on the apparatus.

(v) An aspect of the present invention includes the image forming apparatus that includes the display controller.

(vi) In the image forming apparatus, the display unit may display presence or absence of a printing sheet to be used to form the image, and the display to be updated may be such display that the printing sheet is no longer available.

In this way, when the printing sheet to be used to form the image becomes no longer available, it is possible to enlarge the display area for the information on the apparatus and thus to facilitate understanding of the information by the user.

(vii) In the image forming apparatus, the display unit may display, as the information on the apparatus, the state where the print job is currently executed, and the display to be updated may be display indicative of a start of the print job.

In this way, when the print job is started, it is possible to enlarge the display area for the information on the apparatus and thus to facilitate understanding of the information by the user.

(viii) An aspect of the present invention is a display control method that includes: displaying the information on the apparatus together with the menu of the operations to be accepted by the apparatus on the display unit and displaying at least one item included in the menu in the compact display; accepting the operation for the menu to switch the compact display of the menu item to the full display; and switching the full display of the menu item to the compact display at the time of updating display other than the menu, and the computer executes each of the steps.

The preferred aspects of the present invention include a combination of any of the above-described aspects.

In addition to the above-described embodiments, various modified examples can be made to the present invention. Those modified examples should not be construed as not belonging to the scope of the present invention. The present invention should include all modifications that fall within the scope and equivalent meaning of the claims.

DESCRIPTION OF REFERENCE NUMERALS

10: Operation unit
11: Image forming control circuit
12: Display unit
12a, 12b, 12c, 12d, 12e, 12f, 12g, 12h: Basic screen
13: Printer unit
14: Document table
15: Scanner unit
16: Document conveying unit
17a, 17b: Paper tray
18: Discharge tray
20: Image processing circuit
21: Display control circuit
22: Screen controller
24: Communication interface circuit
31: [FAX] key
32: [SCANNER] key
33: [COPY] key
34: Direction key
35: [OK] key
36: [COLOR START] key
37: [MONOCHROME START] key
38: CLEAR ALL key
39: Communication state display lamp
41: Menu display area
42: Number of paper display area
43: Message display area
44: Status display area
50: "COMMAND WINDOW NOT OPERATED" state
51: "DETERMINE DISPLAY STATUS" state
52: "COPY READY DISPLAY" state
53: "COPY JOB IN PROGRESS DISPLAY" state
54: "TRAY OPENED DISPLAY" state
60: "COMMAND WINDOW IN-OPERATION" state
100: Image forming apparatus
101: Display control unit

What is claimed is:

1. A display controller comprising:
a display device that displays information on an apparatus together with a menu of operations to be accepted;
a screen controller that switches at least one item included in the menu between full display and compact display for display; and
operation circuitry that accepts an operation from a user including an operation for the menu, wherein
in a case where the operation circuitry accepts the operation for the menu, the screen controller switches the compact display of the menu item to the full display in response to the operation, and in a case where the full display of the menu item is provided at the time of updating display other than the menu, the screen controller switches the menu item to the compact display, wherein the screen controller controls to display the compact display in a manner that at least one character at an end of the menu item is replaced with a mark signifying an abbreviation and to display the full display in a manner that no character of the menu item is abbreviated.

2. The display controller according to claim 1, wherein in a case where the operation circuitry accepts the operation related to the display other than the menu, the screen controller switches the full display of the menu item to the compact display.

3. The display controller according to claim 1, wherein when the operation circuitry accepts a compact display instruction as the operation for the menu, the screen controller switches the full display of the item to the compact display.

4. The display controller according to claim 1, wherein in a case where the operation circuitry does not accept a next operation for the menu before a predetermined period elapses from the acceptance of the operation for the menu, the screen controller switches the full display of the item to the compact display.

5. An image forming apparatus comprising the display controller according to claim 1.

6. The image forming apparatus according to claim 5, wherein
the display device displays, as information on the apparatus, presence or absence of a printing sheet to be used to form an image, and
display to be updated is such display that the printing sheet is no longer available.

7. The image forming apparatus according to claim 5, wherein
the display device displays, as information on the apparatus, a state where a print job is currently executed, and
display to be updated is display indicative of a start of the print job.

8. A display control method comprising:
displaying information on an apparatus together with a menu of operations to be accepted by the apparatus on a display unit and displaying at least one item included in the menu in compact display;
accepting an operation for the menu to switch compact display of the menu item to full display; and
switching the full display of the menu item to the compact display at the time of updating display other than the menu, wherein
a computer executes each of the steps, and wherein
controlling to display the compact display in a manner that at least one character at the end of the menu item is replaced with a mark signifying an abbreviation and to display the full display in a manner that no character of the menu item is abbreviated.

* * * * *